United States Patent
Shin et al.

(10) Patent No.: US 11,552,944 B2
(45) Date of Patent: Jan. 10, 2023

(54) SERVER, METHOD FOR CONTROLLING SERVER, AND TERMINAL DEVICE

(71) Applicant: SAMSUNG ELECTRONICS CO., LTD., Suwon-si (KR)

(72) Inventors: Jun-bum Shin, Suwon-si (KR); Kyung-sun Cho, Seoul (KR); Jin-su Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 458 days.

(21) Appl. No.: 16/754,298

(22) PCT Filed: Oct. 4, 2018

(86) PCT No.: PCT/KR2018/011745
§ 371 (c)(1),
(2) Date: Apr. 7, 2020

(87) PCT Pub. No.: WO2019/074240
PCT Pub. Date: Apr. 18, 2019

(65) Prior Publication Data
US 2020/0314094 A1    Oct. 1, 2020

(30) Foreign Application Priority Data
Oct. 11, 2017  (KR) .................. 10-2017-0129779
Nov. 17, 2017  (KR) .................. 10-2017-0154226

(51) Int. Cl.
*G06F 21/62*    (2013.01)
*H04L 9/40*    (2022.01)
(Continued)

(52) U.S. Cl.
CPC .......... *H04L 63/0861* (2013.01); *G06F 21/32* (2013.01); *G06F 21/6227* (2013.01);
(Continued)

(58) Field of Classification Search
CPC ............... H04L 63/0861; H04L 9/3231; H04L 63/0428; G06F 21/32; G06F 21/6227;
(Continued)

(56) References Cited

U.S. PATENT DOCUMENTS 4,151,512 A * 4/1979 Riganati ............ G06V 40/1359
382/125
5,982,914 A * 11/1999 Lee .................. G06T 3/0006
382/125
(Continued)

FOREIGN PATENT DOCUMENTS

JP    2008-59509    3/2008
JP    2009-282945    12/2009
(Continued)

OTHER PUBLICATIONS

Hong et al. "Fingerprinting Image Enhancement: Algorithm and Performance Evaluation" IEE Trans. on Pattern Analysis and Machine Intelligence, vol. 20, No. i, Aug. 1998, pp. 777-789 (Year: 1998).*
(Continued)

*Primary Examiner* — Jeffrey C Pwu
*Assistant Examiner* — Nega Woldemariam
(74) *Attorney, Agent, or Firm* — Nixon & Vanderhye, P.C.

(57) ABSTRACT

Disclosed is a server for performing authentication or identification using biometric information including basic information and detailed information includes a storage for storing basic information and detailed information that are separately encrypted for each of a plurality of users, a communicator for communicating with an external device, and a processor configured to, based on separately encrypted basic information and detailed information being received from an external terminal device through the communicator, performing user authentication or user identification for the (Continued)

received basic information and detailed information by decrypting and comparing the stored encrypted basic information and the received encrypted basic information, and comparing the received detailed information with at least one piece of stored detailed information corresponding to a piece of basic information having a degree of similarity that is higher than or equal to a predetermined value and with the received basic information among the stored basic information.

13 Claims, 12 Drawing Sheets

(51) Int. Cl.
  *G06F 21/32* (2013.01)
  *H04L 9/32* (2006.01)
  *G06V 40/16* (2022.01)
  *G06V 40/18* (2022.01)
  *G06V 40/12* (2022.01)

(52) U.S. Cl.
  CPC ........ *G06V 40/1371* (2022.01); *G06V 40/172* (2022.01); *G06V 40/197* (2022.01); *H04L 9/3231* (2013.01); *G06F 2221/2107* (2013.01)

(58) Field of Classification Search
  CPC .......... G06F 2221/2107; G06F 21/602; G06V 40/1371; G06V 40/172; G06V 40/197; G06V 40/53; G06V 40/10; G06V 40/1347; G06V 40/168; G06V 40/18
  USPC ............................................................ 726/7
  See application file for complete search history.

(56) References Cited

U.S. PATENT DOCUMENTS

| | | | | |
|---|---|---|---|---|
| 6,173,068 | B1* | 1/2001 | Prokoski | A61B 5/7264 |
| | | | | 382/125 |
| 6,591,002 | B2* | 7/2003 | Lee | G06V 40/1353 |
| | | | | 382/125 |
| 7,711,152 | B1 | 5/2010 | Davida et al. | |
| 8,135,180 | B2 | 3/2012 | Baltatu et al. | |
| 9,792,460 | B2 | 10/2017 | An et al. | |
| 2007/0230754 | A1* | 10/2007 | Jain | G06V 40/1371 |
| | | | | 382/125 |
| 2008/0192994 | A1* | 8/2008 | Chau | G06V 40/1324 |
| | | | | 382/125 |
| 2009/0226052 | A1* | 9/2009 | Fedele | G06V 40/1359 |
| | | | | 382/199 |
| 2018/0069696 | A1* | 3/2018 | Yoo | H04L 63/0428 |
| 2018/0129788 | A1* | 5/2018 | Sitrick | G06F 21/10 |
| 2018/0309733 | A1* | 10/2018 | Martin | G06F 5/00 |
| 2020/0252210 | A1* | 8/2020 | Sharfman | H04L 9/14 |
| 2020/0314094 | A1* | 10/2020 | Shin | G06V 40/172 |

FOREIGN PATENT DOCUMENTS

| | | |
|---|---|---|
| JP | 4744180 | 8/2011 |
| JP | 2017-37281 | 2/2017 |
| KR | 10-0698723 | 3/2007 |
| KR | 10-2015-0098097 | 8/2015 |
| KR | 10-1763011 | 8/2017 |
| WO | 2015/122789 | 8/2015 |
| WO | 2016/011204 | 1/2016 |
| WO | 2017/031849 | 3/2017 |

OTHER PUBLICATIONS

Kryszczuk et al. "Study of the Distinctive ness of Level 2 and Level 3 Features in Fragmentary Fingerprinting Comparison" Lecture Note in Computer Science, vol. 3087/2004, Sep. 2004, pp. 124-133 (Year: 2004).*

"Privacy Preserving Fingerprint Authentication via Inner Product Encryption", 12 pages.

International Search Report for PCT/KR2018/011745 dated Feb. 11, 2019, 5 pages with English Translation.

Written Opinion of the ISA for PCT/KR2018/011745 dated Feb. 11, 2019, 7 pages with English Translation.

* cited by examiner

| SBH | BDB | SB |

FIG. 4A

| SBH | BDB-baseline | BDB-detail | SB |

FIG. 4B

| SBH | BDB-baseline | SB |

| SBH | BDB-detail | SB |

FIG. 4C

SERVER, METHOD FOR CONTROLLING SERVER, AND TERMINAL DEVICE

This application is the U.S. national phase of International Application No. PCT/KR2018/011745 filed Oct. 4, 2018 which designated the U.S. and claims priority to KR Patent Application No. 10-2017-0129779 filed Oct. 11, 2017, and KR Patent Application No. 10-2017-0154226 filed Nov. 17, 2017, the entire contents of each of which are hereby incorporated by reference.

TECHNICAL FIELD

This disclosure relates to a server, a method for controlling a server, and a terminal device. More particularly, the disclosure relates to a server for performing authentication or identification using biometric information, a method for controlling a server, and a terminal device.

BACKGROUND ART

Biometric recognition technology is to identify or authenticate individuals by extracting biometric information of a person by an automated device. Since the biometric information is difficult to modulate or clone due to its nature, biometric recognition technology is emerging as a secure security technology as a service such as the Internet of Things (IoT)-based FinTech, healthcare, location-based service, and the like, is being expanded.

In the biometric recognition technology, since the biometric information is related to privacy, or the like, of an individual, the biometric information is encrypted and protected at a high level, and if necessary, the biometric information is decrypted and processed. That is, the biometric information is transmitted or stored in an encrypted state, and if the user authentication or identification is necessary, the biometric information is decrypted and processed.

In the biometric recognition technology, "verification or authentication" and "recognition or identification" are used in different meanings. Specifically, verification or authentication is to confirm whether a specific user is himself or herself and is processed through a 1:1 matching between the presented biometric information and the registered biometric information, and recognition or identification is to confirm of whom biometric information is presented and is processed through a 1:N matching between the presented biometric information and the registered biometric information.

Generally, as for the decrypted biometric information, after basic information which has a key characteristic is processed and then whether to process detailed information is determined according to the processing result. For example, if fingerprint information is used as biometric information, after comparing core-point information of the fingerprint, detailed information is compared with respect only to candidates having a similarity greater than or equal to a threshold value, to recognize or identify a user.

Processing performance may be improved by separating the decrypted biometric information into basic information and detailed information and processing the separated basic information and detailed information. However, in the case of encryption, according to an existing international standard, such as ISO/IEC 19785 CBEFF, the biometric information is not hierarchically classified, and the entire biometric information is encrypted collectively.

The embodiment is not limited to a recognition or identification process, but for a user recognition or identification process requiring a 1:N comparison, the biometric information of all N registered users must be collectively decrypted without classification of the basic information and detailed information, thereby causing performance degradation of the biometric authentication/identification system due to unnecessary decryption.

DISCLOSURE

Technical Problem

The disclosure provides a server for performing authentication or identification using biometric information hierarchically encrypted, a method for controlling a server, and a terminal device.

Technical Solution

According to an embodiment, a server for performing authentication or identification using biometric information including basic information and detailed information includes a storage for storing basic information and detailed information that are separately encrypted for each of a plurality of users, a communicator for communicating with an external device, and a processor configured to, based on separately encrypted basic information and detailed information being received from an external terminal device through the communicator, performing user authentication or user identification for the received basic information and detailed information by decrypting and comparing the stored encrypted basic information and the received encrypted basic information, and comparing the received detailed information with at least one piece of stored detailed information corresponding to a piece of basic information having a degree of similarity that is higher than or equal to a predetermined value with the received basic information among the stored basic information.

The basic information is configured to have less information amount than the detailed information.

The processor may perform the user identification by decrypting all the stored basic information to calculate a similarity between the decrypted basic information with the received basic information, and decrypting and comparing the at least one stored detailed information and the received detailed information.

The processor may, based on receiving, from the external terminal device, identification information and the separately encrypted basic information and detailed information, decrypt basic information for the specific user among the stored encrypted basic information and the received encrypted basic information to calculate a similarity, and based on the similarity being greater than or equal to a predetermined value, decrypt and compare stored detailed information corresponding to the specific user and the received detailed information to perform a user authentication for the specific user.

The storage may store the biometric information with one data format for each of the plurality of users, and the basic information and detailed information may be information in which the biometric information is hierarchically encrypted in the one data format.

The storage may store the basic information and the detailed information in a separate data format for each of the plurality of users, and the basic information and the detailed information may be information in which the biometric information is hierarchically encrypted in the separate data format.

Based on the biometric information being fingerprint information, the basic information and the detailed information may be classified with respect to a fingerprint core point, based on the biometric information being face information, the basic information and the detailed information may be classified with respect to a face contour, and based on the biometric information being iris information, the basic information and the detailed information may be classified with respect to upper and lower eyelids.

Based on the biometric information being fingerprint information, the basic information may include reference point information that is used for finger alignment, and the detailed information may include minutiae point information that is used for detailed matching of the fingerprint.

The reference point may include a core point or a delta point of the fingerprint, or one or more high curvature points of the fingerprint.

According to an embodiment, a terminal device includes a biometric information detector configured to detect biometric information of a user, a communicator configured to communicate with an external server, and a processor configured to, based on biometric information of the user being detected through the biometric information detector, separate the detected biometric information into basic information and detailed information and encrypt the information respectively, control the communicator to transmit the encrypted basic information and the detailed information to the external server, and authenticate or identify the user according to a processing result of the encrypted basic information and detailed information received from the external server.

The basic information may have an information amount less than the detailed information.

According to an embodiment, a method for controlling a server performing authentication or identification using biometric information including basic information and detailed information includes storing separately encrypted basic information and detailed information, for each of a plurality of users, receiving separately encrypted basic information and detailed information from an external terminal device, decrypting and comparing the stored encrypted basic information and the received encrypted basic information, and performing use authentication or user identification for the received basic information and the detailed information by comparing the received detailed information with at least one piece of stored detailed information corresponding to a piece of basic information having a degree of similarity that is higher than or equal to a predetermined value with the received basic information among the stored basic information.

The basic information may have less information amount than the detailed information.

The decrypting and comparing may include decrypting all the stored basic information to calculate a similarity between the decrypted basic information with the received basic information, respectively, and the performing user authentication or identification may include decrypting the at least one stored detailed information and the received detailed information to perform the user identification.

The receiving includes receiving, from the external terminal device, identification information and the separately encrypted basic information and detailed information for a specific user, and the encrypting and comparing may include decrypting basic information for the specific user among the stored encrypted basic information and the received encrypted basic information to calculate a similarity, wherein the performing the user authentication or identification may include, based on the similarity being greater than or equal to a predetermined value, decrypting and comparing stored detailed information corresponding to the specific user and the received detailed information to perform a user authentication for the specific user.

The storing may include storing the biometric information with one data format for each of the plurality of users, and the basic information and detailed information may be information in which the biometric information is hierarchically encrypted in the one data format.

The storing may include storing the basic information and the detailed information in a separate data format for each of the plurality of users, the basic information and the detailed information may be information in which the biometric information is hierarchically encrypted in the separate data format.

Based on the biometric information being fingerprint information, the basic information and the detailed information may be classified with respect to a fingerprint core point, based on the biometric information being face information, the basic information and the detailed information may be classified with respect to a face contour, and based on the biometric information being iris information, the basic information and the detailed information may be classified with respect to upper and lower eyelids.

Based on the biometric information being fingerprint information, the basic information may include reference point information that is used for finger alignment, and the detailed information may include minutiae point information that is used for detailed matching of the fingerprint.

The reference point may include a core point or a delta point of the fingerprint, or one or more high curvature points of the fingerprint.

Effect of Invention

According to various embodiments, the disclosure provides a server for performing authentication or identification using hierarchically encrypted biometric information, a method for controlling a server, and a terminal device. Accordingly, performance degradation of a biometric information recognition/authentication system due to unnecessary decryption may be minimized.

DESCRIPTION OF DRAWINGS

FIGS. 4A, 4B, and 4C are exemplary diagrams to describe a data format of separately encrypted basic information and detailed information according to an embodiment;

DETAILED DESCRIPTION OF EXEMPLARY EMBODIMENTS

Figure 1:
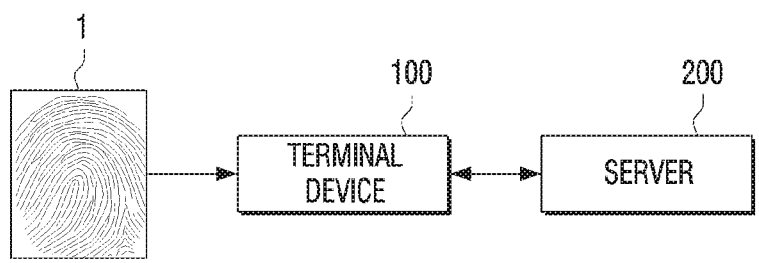
FIG. 1 is a configuration diagram of a user authentication/identification system of a user according to an embodiment.

Hereinafter, embodiments of the disclosure will be described with reference to the accompanying drawings. However, it may be understood that the disclosure is not limited to the embodiments described hereinafter, but include various modifications, equivalents, and alternatives of the embodiments of the disclosure. For the description of the drawings, similar reference numerals may be used for similar constituent elements.

In the disclosure, the term "has," "may have," "includes" or "may include" indicates existence of a corresponding feature (e.g., a numerical value, a function, an operation, or a constituent element such as a component), but does not exclude existence of an additional feature.

In the disclosure, the term "A or B," "at least one of A or/and B," or "one or more of A or/and B" may include all possible combinations of the items that are enumerated together. For example, the term "A or B", "at least one of A and B", or "at least one of A or B" may designate (1) at least one A, (2) at least one B, or (3) both at least one A and at least one B.

In the disclosure, the terms "first, second, etc." may be used to describe various elements regardless of their order and/or importance and to discriminate one element from other elements, but are not limited to the corresponding elements.

If it is described that an element (e.g., first element) is "operatively or communicatively coupled with/to" or is "connected to" another element (e.g., second element), it may be understood that the element may be connected to the other element directly or through still another element (e.g., third element). When it is mentioned that one element (e.g., first element) is "directly coupled" with or "directly connected to" another element (e.g., second element), it may be understood that there is no element (e.g., third element) present between the element and the other element.

Herein, the expression "configured to" may be used interchangeably with, for example, "suitable for", "having the capacity to", "designed to", "adapted to", "made to", or "capable of". The expression "configured to" does not necessarily mean "specifically designed to" in a hardware sense. Instead, under some circumstances, "a device configured to" may indicate that such a device may perform an operation along with another device or part. For example, the expression "a processor configured to perform A, B, and C" may indicate an exclusive processor (e.g., an embedded processor) to perform the corresponding operation, or a generic-purpose processor (e.g., a central processor (CPU) or application processor (AP)) that may perform the corresponding operations by executing one or more software programs stored in the memory device.

Hereinbelow, various embodiments will be described in greater detail with reference to accompanying drawings.

FIG. 1 is a configuration diagram of a user authentication/identification system of a user according to an embodiment. Referring to FIG. 1, a user authentication/identification system 10 includes a terminal device 100 and a server 200. The terminal device 100 and the server 200 may be interconnected by various wired or wireless networks for transmitting and receiving various information.

The user authentication/identification system 10 may authenticate or identify the user using the user's biometric information. The terminal device 100 may obtain biometric information of a user desired to be authenticated or identified and transmit the obtained biometric information to the server 200. The server 200 stores biometric information of a plurality of users, and the server 200 may compare the biometric information received from the terminal device 100 with the registered biometric information to authenticate or identify a user corresponding to the received biometric information, and transmit the result to the terminal device 200. Accordingly, the terminal device 100 may provide the user with a user authentication or identification result corresponding to the obtained biometric information.

According to an embodiment, the terminal device 100 may separate the obtained biometric information into basic information and detailed information for encryption, and transmit the separately encrypted basic information and detailed information to the server 200. The server 200 may separately encrypt and store biometric information for each of a plurality of registered users as basic information and detailed information. Separating the biometric information into basic information and detailed information and separately encrypting merely refer to distinguishing information corresponding to basic information and detailed information among biometric information for encryption, and do not mean that the separately encrypted biometric information is necessarily generated as a separate file. That is, in accordance with one embodiment, the basic information and detailed information may be respectively encrypted in one data format, and may be encrypted in separate data formats, respectively.

The biometric information may be separated into basic information and detailed information according to various criteria. In one example, information regarding a schematic content of the contents of the biometric information may be basic information, and information regarding the detailed content may be detailed information. Other embodiments will be described later.

As described above, according to an embodiment, since the biometric information is separately encrypted as basic information and detailed information, the basic information and detailed information may be separately decrypted when decrypting information for processing, unlike the conventional technology or standards in which the biometric information is not hierarchically separated, and the entire biometric information is collectively encrypted.

In the example of FIG. 1, the terminal device 100 may obtain fingerprint information 1 of the user requiring authentication or identification, separate the obtained fingerprint information 1 into basic information and detailed information, hierarchically encrypt the fingerprint information 1, and then transmit the encrypted fingerprint information 1 to the server 200. For example, the fingerprint information within a radius of 4 mm based on the core point of the user fingerprint 1 may be basic information, and the fingerprint information of the remaining area may be detailed information.

As the server 200 receives the basic information and the detailed information separately encrypted from the terminal device 100, separates the biometric information for the plurality of users into basic information and detailed information, and stores the basic information and the detailed information, the server 200 may decrypt only the basic information received from the terminal device 100 and the stored basic information and preferentially compare the received basic information and the stored basic information. The server 100 may perform user authentication or identification by decrypting only the detailed information requiring decrypting among the stored detailed information according to the comparison result of the basic information, and then comparing the decrypted detailed information with the detailed information received from the terminal device 100. At this time, for comparison between detailed information, the received detailed information will be also decrypted.

The server 100 may transmit an authentication or identification result to the terminal device 100 and the terminal device 100 may receive an authentication or identification result for the user from the server 200 and provide the same.

According to an embodiment, unlike the related-art, degradation of the user authentication/identification system 10 using biometric information by unnecessary decrypting may be prevented.

In the example of FIG. 1, the biometric information is a fingerprint of a user. However, biometric information that may be used in various embodiments is not limited thereto. For example, any kind of biometric information that may be used in existing biometric technology, such as biological characteristics of a person, such as a fingerprint, face, palm print, hand shape, iris, retina, vein, deoxyribonucleic acid (DNA), or the like, or a user's behavioral characteristics such as signature/handwriting, voice, keyboard input, gait, or the like, may be used in various embodiments.

Figure 2:
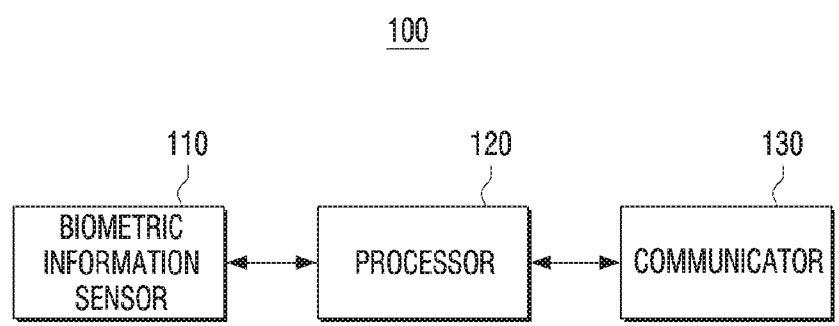
FIG. 2 is a block diagram of a terminal device according to an embodiment.

FIG. 2 is a block diagram of the terminal device 100 according to an embodiment. The terminal device 100 may be implemented with various kinds of electronic devices according to fields (for example, financial, security, access management, medical welfare, public, quarantine, entertainment, etc.) in which a user recognition or identification technique using biometric information may be applied. For example, the terminal device 100 may be implemented as, but not limited to, various electronic devices such as auto teller's machine (ATM), a desktop personal computer (PC), laptop PC, a network computer, a personal digital assistant (PDA), a mobile phone, an automobile, an e-book reader, a portable multimedia player (PMP), an MP3 player, various medical devices, cameras, Internet of Things, wearable devices, or the like.

Referring to FIG. 2, the terminal device 100 includes a biometric information sensor 110, a processor 120, and a communicator 130.

The biometric information sensor 110 may detect the biometric information of the user. As described above, the biometric information of the user may include both a biological characteristic of a human, such as a finger print, a face, a palm print, a hand shape, an iris, a retina, a vein, a DNA, etc., and a user's behavioral characteristic such as signature/handwriting, voice, keyboard input, gait, or the like, so that the biometric information sensor 110 may include various sensors capable of sensing the biological information according to various kinds of biometric information. For example, the biometric information sensor 110 may include, but is not limited to, an image sensor, an ultrasonic sensor, an electromagnetic sensor, a thermal sensor, a pressure sensor, an electrostatic capacity sensor, a DNA sensor, and the like.

The communicator 130 may communicate with various types of external devices or external servers based on various types of communication methods. In particular, the communicator 130 may communicate with the server 200 through various communication methods under the control of the processor 120. For example, the server 200 may be a server for providing a user recognition or identification service using biometric information.

The communicator 130 may include one or more modules that enable wireless communication between the terminal device 100 and a communication system (e.g., a mobile communication system), between the terminal device 100 and another terminal device, or between the terminal device 100 and the server 200. The communicator 130 may also include one or more modules for connecting the terminal device 100 to one or more networks. For this purpose, the communicator 130 may include at least one of a broadcast receiving chip (not shown), a wireless communication chip (not shown), or a local area communication chip (not shown).

The processor 120 controls overall operations of the terminal device 100. The processor 120 may, when the biometric information of a user is detected through the biometric information sensor 110, separate the detected biometric information into basic information and detailed information and separately encrypt the basic information and the detailed information.

The basic information and the detailed information are information in which the biometric information is separated according to a specific criteria, and the criteria for separating the basic information and the detailed information from the biometric information may be implemented in various forms, through experiment or know-how, or the like, of a system designer. According to an embodiment, the criteria for separating the biometric information into basic information and detailed information should be set such that the amount of information of the basic information is less than the amount of information of the detailed information as a result of the information being divided according to a corresponding criterion.

For example, the processor 120 may separate (or divide) the basic information and the detailed information from the biometric information based on the area of a living body which the biometric information represents. For example, if the target living body is a fingerprint, the processor 120 may separate fingerprint information indicating a region within a predetermined radius based on the core point of the fingerprint as basic information, and may separate fingerprint information indicating an area beyond the predetermined radius or an entire area as detailed information. Also, if the object living body is an iris, the processor 120 may separate the iris information of the area between the upper and lower eyelids as basic information and may separate the iris information of the remaining area or the entire area as detailed information. If the object living body is a face, the processor 120 may separate information indicating the contour of the face as basic information, and may separate information indicating minutiae points of the entire area including the remaining part of the face such as eyes, nose, mouth, ear, etc. as detailed information.

The processor 120 may separate the basic information and the detailed information based on the level of the information. For example, the processor 120 may recognize upper-level information indicating the schematic content of the biometric information object as basic information and lower-level information indicating the detailed content as detailed information. At this time, a reference for dividing the upper-level information and the lower-level information may also be implemented in various forms, such as through experiment or know-how of a system designer, or the like.

The separated basic information and detailed information may be encrypted, respectively. The processor 120 may encrypt the basic information and the detailed information in various encryption methods, including the encryption method according to the conventional biometric recognition technology standard. Since the detailed description of the encryption method is out of the gist of the disclosure, a detailed description thereof will be omitted.

The processor 120 may control the communicator 110 to transmit the encrypted basic information and the detailed information to the external server, and provide the user verification or authentication result to a user according to a processing result of the basic information and the detailed information received from the external server 200.

For example, if the terminal device 100 is an automated teller machine (ATM) including an iris recognition function, the processor 120 may provide the user with a screen related to whether the amount of money requested by the user is approved according to the iris authentication of the user of the server 200. In addition, in the case where the terminal device 100 is a fingerprint recognition device located in an immigration office, the terminal device 100 may provide the user with a result screen related to the admission of the user according to the user fingerprint identification result of the server 200. The example of providing the verification or identification result to a user according to the received biometric information result received by the terminal device 100 from the server 200 is not limited thereto, and as described above, biometric recognition or identification results may be provided in various forms according to various fields in which a biometric technique such as financial, security, access management, medical welfare, public, quarantine, entertainment, or the like, is used.

The processor 120 may include one or more of a central processing unit (CPU), a controller, an application processor (AP), a communication processor (CP), an Advanced reduced instruction set computer (RISC) Machines (ARM) processor.

Figure 3:
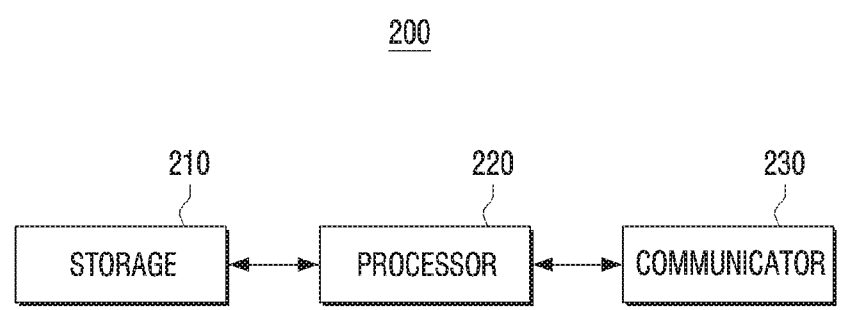
FIG. 3 is a block diagram of a server according to an embodiment.

FIG. 3 is a block diagram of a server 200 according to an embodiment. Referring to FIG. 3, the server 200 includes a storage 210, a processor 220, and a communicator 230.

The storage 210 stores various programs and information. In particular, the storage 210 may store separately encrypted basic information and detailed information for each of the plurality of users. Here, the plurality of users may be users registered in an authentication or identification service using biometric information provided by the server 200. The separately encrypted basic information and detailed information may be the biometric information for each of the plurality of users being separately encrypted by being divided into basic information and detailed information according to a specific reference as described above in FIG. 2.

Meanwhile, the storage 210 may match and store encrypted biometric information (separately encrypted basic information and detailed information) for each of the plurality of users together with the identification information of each user. At this time, the identification information may be information about a user to be presented when the user subscribes to a recognition or identification service using biometric information and registers with the server 200. For example, the identification information may include, but is not limited to, a user's name, a telephone number, an address, a mail address, a resident registration number, or the like, to be distinguished from another user.

The storage 210 may include, but is not limited to, a Random Access Memory (RAM), a Read Only Memory (ROM), a Solid State Disk (SSD), various semiconductor memories such as flash memory, a hard disk, and an optical storage medium such as a magnetic storage medium or a compact disc (CD). According to an embodiment, the storage 210 may be connected to the server 200 and, if necessary, may be implemented with a separate database server or a cloud server that provides biometric information to the server 200 through communication with the server 200.

The communicator 230 performs communication with an external device. The communicator 230 may be controlled by the processor 220, to receive, from the external terminal device 100, the user's biometric information separately encrypted by being divided into basic information and detailed information and transmit the processing result for the received biometric information to the external terminal device 100.

For this purpose, the communicator 230 may include at least one communication module of a local area wireless communication module (not shown) and a wireless local area network (LAN) communication module (not shown). The local area wireless communication module (not shown) is a communication module for wirelessly communicating data with an external device located in a short distance and may include, for example, a Bluetooth module, a ZigBee module, a near field communication (NFC) module, an infrared communication module, or the like. The wireless LAN communication module (not shown) is a module connected to an external network and performing communication with an external server or an external device according to a wireless communication protocol such as Wi-Fi, Institute of Electrical and Electronics Engineers (IEEE), or the like.

The communicator 230 may further include a mobile communication module for performing communication by accessing to a mobile communication network according to various mobile communication standards such as $3^{rd}$ generation (3G), 3rd Generation Partnership Project (3GPP), Long Term Evolution (LTE), or the like, and may further include a wired communication module (not shown) according communication standards such as high-definition multimedia interface (HDMI), a universal serial bus (USB), an Institute of Electrical and Electronics Engineers (IEEE) 1394, RS-232, RS-422, RS-485, Ethernet, or the like.

The processor 220 controls overall operation of the server 200.

The processor 220 may register biometric information according to the user's request and store the information in the storage 210. For example, when the biometric information and the identification information of the user are obtained, the terminal device 100 may separately encrypt the obtained biometric information into the basic information and detailed information, and transmit the encrypted biometric information to the server 200 along with the identification information. The terminal device 100 may transmit the biometric information registration request to the server 200. Accordingly, when separately encrypted basic information and detailed information, user identification information, and biometric information registration request are received from the terminal device 100, the processor 200 may match and store the received encrypted basic information and detailed information in the storage 210 with the user identification information.

According to an embodiment, when identification information and biometric information of a user are received together with a user's biometric information registration request from another terminal device without a function of separately encrypting biometric information with basic information and detailed information, (the biometric information is not divided into basic information detail information, and all of the biometric information may be encrypted as one), the processor 220 may decrypt the received biometric information, divide the decrypted biometric information into basic information and detailed information, encrypt each information, match the information with the identification information of the user, and store the same in the storage 210. Here, the method for encrypting the biometric information decrypted by the processor 220 with the basic information and the detailed information is the same as described above with respect to the terminal device 100 of FIG. 2, and thus a description thereof will be omitted.

The processor 220 may compare the biometric information of the user received from the external terminal device 100 with the biometric information stored in the storage 210 to perform authentication or identification of the user. Specifically, when the basic information and the detailed information encrypted separately from the external terminal device 100 are received through the communicator 230, the processor 220 may compare the basic information stored in the storage 210 with the basic information received from the terminal device 100, compare the detailed information stored in the storage 210 with the detailed information received from the terminal device 100 according to the result of the basic information comparison, and perform authentication or identification.

Since the basic information and the detailed information received from the terminal device 100 are separately encrypted and received in the storage 210, the processor 220 may decrypt and compare the stored basic information and the received basic information, compare the received basic information with the received basic information, and compare the detailed information corresponding to the basic information having a predetermined value of similarity with the received basic information, among the stored basic information, with the received detailed information, to perform authentication or identification. In this case, the decrypting method may apply the encryption method in reverse, but is not limited thereto.

As described above, the user authentication (or verification) using the biometric information and identification (or recognition) refer to different processing processes. This will be described below.

First, according to an embodiment, the identification or recognition refers to recognition of the user corresponding to the biometric information presented by the terminal device 100 by the server 200, and the server 200 compares the biometric information of all registered users with the received biometric information to identify and recognize a user corresponding to the received biometric information. As described above, in the identification process, the comparison of all registered biometric information with the received biometric information is because the process of finding the user corresponding to the biometric information having the highest similarity with the biometric information received from the user registered in the server 200 is identification or recognition process.

Accordingly, the processor 220 may decrypt the basic information stored in the storage 210 and decrypt the received basic information, and then compare the stored basic information corresponding to each of the plurality of users with the received basic information to calculate each similarity.

The processor 220 may compare the stored detailed information corresponding to the basic information having the calculated similarity equal to or greater than a predetermined value with the received detailed information to perform a user identification (or recognition). At this time, the comparison between detailed information is also performed after decrypting the encrypted detailed information.

Specifically, the processor 220 may compare the received detailed information with at least one detailed information corresponding to the basic information having a basic information similarity equal to or greater than a predetermined value to calculate a detailed information similarity. Thereafter, the processor 220 may identify or recognize the user corresponding to the detailed information having the greatest detailed information similarity among the plurality of users as a user corresponding to the basic information and the detailed information received from the terminal device 100.

According to an embodiment, the processor 220 may add up basic information similarity and detailed information similarity to identify (or recognize) a user having the highest similarity as a user corresponding to the biometric information received from the terminal device 100.

The processor 220 may control the communicator 210 to transmit a user identification (or recognition) result corresponding to the received biometric information to the terminal device 100. For example, the processor 220 may transmit, to the terminal device 200, a message indicating that the user is a user registered with the server 200 or various identification information stored for the identified user, but the embodiment is not limited thereto. If biometric information having a similarity greater than or equal to a predetermined value does not exist in the storage 210 according to an embodiment, the processor 220 may transmit a message, to the terminal device 100, indicating that the user identification (or recognition) has failed.

User authentication (or verification) using biometric information is to, when the biometric information is presented together with the identification information of the specific user, authenticate or verify whether a specific user is a person corresponding to the proposed biometric information, and the server 200 may compare biometric information corresponding to the presented identification information of the registered plurality of user's biometric information with the received biometric information to authenticate and verify whether the specific user is a user himself or herself.

Accordingly, when the identification information and additionally encrypted basic information and detailed information for a specific user are received from the terminal device 100, the processor 220 may determine identification information matching the received identification information among the identification information stored in the storage 210 and specify the stored basic information and detailed information matched with the determined identification information.

The processor 220 may decrypt the stored basic information and the received basic information specified in accordance with the received identification information to calculate a similarity, and if the calculated similarity is greater than or equal to a predetermined value, the processor 220 may perform authentication for a specific user by decrypting and comparing the stored detailed information specified in accordance with the received identification information and the received detailed information.

For example, if the detailed information similarity is greater than or equal to a predetermined value, the processor 220 may control the communicator 210 to authenticate that the specific user is a user himself or herself, and to transmit a message, to the terminal device 100, indicating that the user's identity authentication has been successfully completed. In contrast, if the identification information matching the received identification information is not present in the storage 210 or the similarity of the basic information or the detailed information is less than a predetermined value, the processor 220 may control the communicator 210 to transmit, to the terminal apparatus 100, a message indicating that authentication of a specific user has failed.

The predetermined value for the basic information similarity and the predetermined value for the detailed information similarity may be set in the same manner or in a different manner according to an embodiment.

The processor 220 may include one or more of the CPU, controller, AP, CP, ARM processor, or the like.

FIG. 4 is an exemplary diagram to describe a data format of separately encrypted basic information and detailed information according to an embodiment.

FIG. 4A illustrates a basic data format of a Common Biometric Exchange Formats Framework (CBEFF) in the conventional ISO/IEC 19785. The data format consists of a Standard Biometric Header (SBH), a Biometric Data Block (BDB) and a Signature Block (SB). At this time, the biometric information is placed in the BDB, and in the related art, as illustrated in FIG. 4A, the biometric information is not divided into basic information and detailed information, and the entire biometric information is encrypted and processed. Accordingly, when a user authentication or identification process using biometric information is performed, system performance degradation due to unnecessary decrypting occurs as described above.

However, according to one embodiment, the processors 120 and 220 may encrypt the user's biometric information in one data format to basic information (BDB-baseline) and detailed information (BDB-detail), as shown in FIG. 4B. Further, according to another embodiment, the processors 120 and 220 may separate the biometric information of the user into basic information (BDB)-baseline and detailed information (BDB) and encrypt the biometric information in a separate data format, as shown in FIG. 4C.

As described above, according to embodiments, the problem of the related art may be solved by hierarchically separating and encrypting biometric information by the processors 120 and 22. Since the detailed description thereof is as described above, a detailed description thereof will be omitted. Meanwhile, the details of the SBH, the BDB, and the SB according to the conventional standard are out of the gist of the disclosure, and thus a detailed description thereof will be omitted.

FIG. 5 is an exemplary diagram to describe a criterion of dividing biometric information into basic information and detailed information according to an embodiment.

Figure 5A:
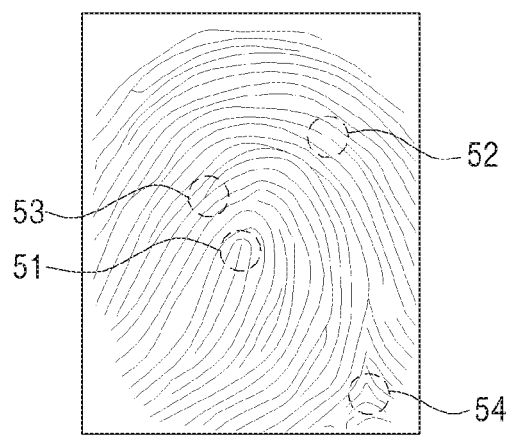
FIGS. 5A and 5B are exemplary diagrams to describe a criterion of dividing biometric information into basic information and detailed information according to an embodiment.

FIG. 5A illustrates feature points that form a fingerprint such as a core point 51, a ridge ending 52, a bifurcation 53, and a delta 54 when the fingerprint is used as biometric information. According to an embodiment, the processors 120 and 220 may include fingerprint information indicating a region within a predetermined radius around the core point 51 of the fingerprint as basic information, and may include fingerprint information indicating a region over a certain radius or an entire fingerprint region as detailed information. Alternatively, the location of the minutiae points 51 through 54 may be the basic information, and the pattern of the entire fingerprint connecting the minutiae points may be the detailed information.

Figure 5B:
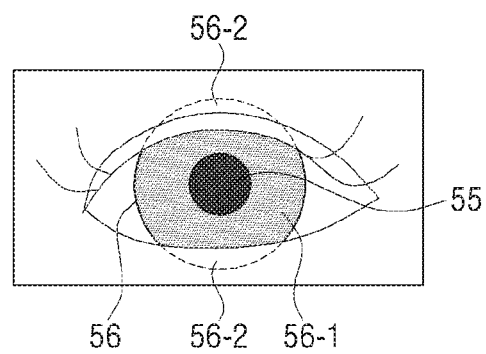

FIG. 5B is a diagram illustrating a criterion for dividing basic information and detailed information when an iris is used as biometric information. According to FIG. 5B, a human eye may include a pupil 55 and an iris 56. The iris 56 may be divided into a region 56-1 located between upper and lower eyelids and a portion 56-2 covered by the upper and lower eyelids, and the processors 120 and 220 may include the iris information of the regions 56-1 between the upper and lower eyelid regions as basic information, and the iris information of the region 56-2 covered by the eyelids or the entire iris region 56 as detailed information.

Figure 6:
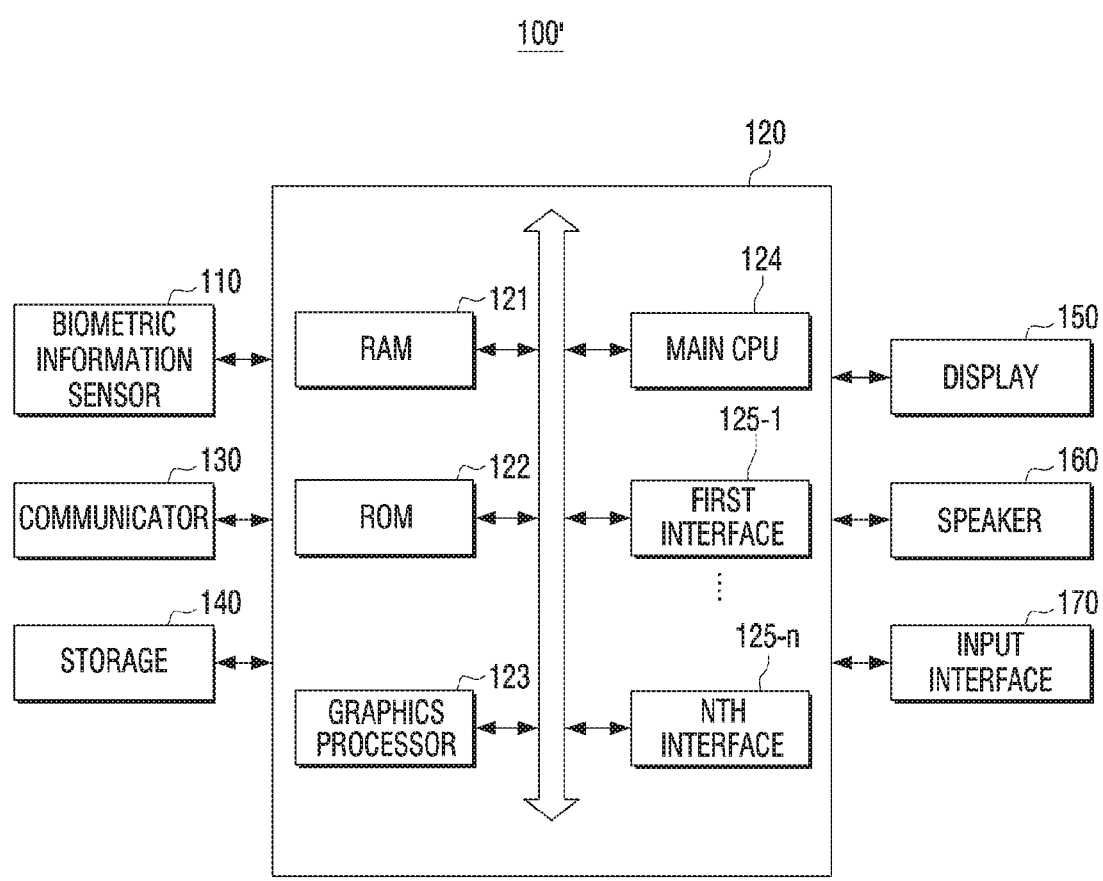
FIG. 6 is a block diagram illustrating a detailed configuration of a terminal device according to an embodiment.

FIG. 6 is a block diagram illustrating a detailed configuration of another terminal device according to another embodiment. Referring to FIG. 6, a terminal device 100' includes a biometric information sensor 110, a processor 120, a communicator 130, a storage 140, a display 150, a speaker 160, and an input interface 170. A detailed description of the biometric information sensor 110, the processor 120, and the communicator 130 will be omitted. Meanwhile, the processor 120 may be electrically connected to the biometric information sensor 110, the communicator 130, the storage 140, the display 150, the speaker 160, and the input interface 170 to control the overall operation and function of the terminal device 100'.

The biometric information sensor 110 senses the biometric information of the user. For this purpose, the biometric information sensor 110 may include various sensors. For example, the biometric information sensor 110 may include a proximity sensor, an illumination sensor, a touch sensor, and acceleration sensor, a magnetic sensor, a gravity sensor (G-sensor), gyroscope sensor, a motion sensor, a red-green-blue (RGB) sensor, an infrared sensor (IR sensor), a finger scan sensor, an ultrasonic sensor, an optical sensor (e.g., an image sensor), a microphone, a battery gauge, an environmental sensor (e.g., a barometer, a humidity meter, a thermometer, a radiation sensor, a thermal sensor, a gas sensor, etc.), a chemical sensor (e.g., an electronic nose, a health care sensor, a biometric sensor, etc.). The processor 120 may utilize information sensed by these sensors.

The communicator 130 may perform communication with various external devices to transmit and receive various information. The communicator 130 may transmit the separately encrypted basic information and detailed information to the server 200 and receive a processing result from the server 200.

For this purpose, the communicator 130 may include at least one communication module of a local area wireless communication module (not shown) and a wireless local area network (LAN) communication module (not shown). The local area wireless communication module (not shown) is a communication module for wirelessly communicating data with an external device located in a short distance and may include, for example, a Bluetooth module, a ZigBee module, a near field communication (NFC) module, an infrared communication module, or the like. The wireless LAN communication module (not shown) is a module connected to an external network and performing communication with an external server or an external device according to a wireless communication protocol such as Wi-Fi, Institute of Electrical and Electronics Engineers (IEEE), or the like.

The communicator 230 may further include a mobile communication module for performing communication by accessing to a mobile communication network according to various mobile communication standards such as $3^{rd}$ generation (3G), 3rd Generation Partnership Project (3GPP), Long Term Evolution (LTE), or the like, and may further include a wired communication module (not shown) according communication standards such as high-definition multimedia interface (HDMI), a universal serial bus (USB), an Institute of Electrical and Electronics Engineers (IEEE) 1394, RS-232, RS-422, RS-485, Ethernet, or the like.

The storage 140 store instructions or data received from the processor 120 or other elements or generated by the processor 120 or other elements. The storage 140 may be implemented as a non-volatile memory, a volatile memory, a flash memory, a hard disk drive (HDD), a solid state drive (SSD), or the like. The storage 140 is accessed by the processor 120 and reading/writing/modifying/deleting/updating of data by the processor 120 may be performed.

The storage 140 may store user's biometric information sensed by the biometric information sensor 110, biometric information separately encrypted into basic information and detailed information by the processor 120, biometric information processing result received from the server 200, or the like.

The display 150 may display various screens. The display 150 may display various screens for performing a function of the terminal device 100' according to the types of the implemented terminal device 100'.

The display 150 may display a screen for sensing biometric information of the user. It is common that the user's biometric information requires user's cooperation for its sensing. For example, in order to obtain biological characteristics of a user such as a fingerprint, an iris, a retina, a vein, a hand shape, a DNA, etc., as biometric information, the subject body needs to be brought into close proximity to the sensor, and to obtain the biological information of the user such as a signature/handwriting, a voice, a keyboard input, a gait, or the like, a specific character input or a specific voice utterance of the user is required. Accordingly, the display 150 may display a screen requiring a specific action to the user to obtain the biometric information of the user. If the authentication result or identification result is received from the server 200, the display 150 may display the result.

The speaker 160 may output audio. The speaker 160 may output a voice guide for sensing user's biometric information or a voice guide for the biometric information processing result according to an embodiment.

The input interface 170 may receive user commands for controlling the terminal device 100'. For example, the input interface 170 may receive a user's voice input, touch input, button manipulation, motion input, or the like. For this purpose, the input interface 170 may include a touch sensor, a motion sensor, an image sensor, an ultrasonic sensor, or the like. Alternatively, a sensor constituting the biometric information sensor 110 may be used. The input interface 170 may be implemented as a touch screen in which the touch sensor and the display 150 are coupled.

The processor 120 controls the overall operation of the terminal device 100'. For example, the processor 120 may drive an operating system or application program to control hardware or software components connected to the processor 120, and may perform various data processing and operations. The processor 120 may also load and process commands or data received from at least one of the other components into a volatile memory and store the various data in a non-volatile memory.

For this purpose, the processor 120 may be implemented with a generic-purpose processor (e.g., a CPU or application processor) capable of performing the operations by executing one or more software programs stored in a dedicated processor (e.g., embedded processor) or memory device for performing the operations.

The processor 120 may include at least one of a random access memory (RAM) 121, a read-only memory (ROM) 122, a graphics processor 123, a main central processing unit (CPU) 124, a first to $n^{th}$ interfaces 125-1~125-n. The RAM 121, the ROM 122, the main CPU 123, the first to $n^{th}$ interfaces 125-1 to 125-n, or the like, may be interconnected through the bus 126.

The main CPU 124 accesses the storage 140 and performs booting using an operating system (OS) stored in the storage 140, and performs various operations using various programs, contents data, or the like, stored in the storage 140.

The ROM 122 stores a command set, or the like, for system booting. When the turn-on command is input and power is supplied, the main CPU 124 copies the OS stored in the storage 140 to the RAM 121 according to a command stored in the ROM 122, and executes the OS to boot the system. When the booting is completed, the main CPU 124 copies various application programs stored in the storage 140 to the RAM 121, may execute the application program copied to the RAM 121, and perform various operations.

The graphics processor 123 may, when booting of the terminal device 100' is completed, may generate a screen including various objects such as an icon, an image, a text, or the like.

FIG. 7 is a diagram illustrating various examples of a user recognition/identification system using biometric information according to an embodiment. In illustrating FIG. 7, the descriptions overlapping with the above will be omitted.

Figure 7A:
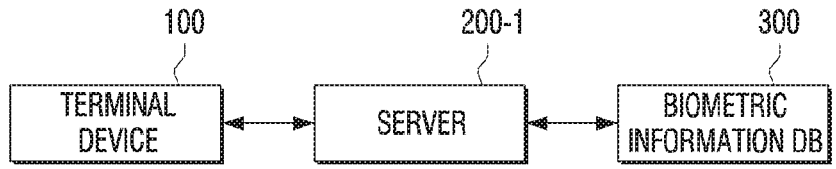
FIGS. 7A, 7B, 7C, and 7D are diagrams illustrating various examples of a user recognition/identification system using biometric information according to an embodiment.

FIG. 7A is similar to the system 10 of FIG. 1. However, unlike the server 200 described above, a server 200-1 of FIG. 7A does not include the storage 230 for storing separately encrypted basic information and detailed information for each of a plurality of users.

Instead, the server 200-1 is connected to a separate biometric information DB server 300 to implement the operation of the server 200. Accordingly, the biometric information DB server 300 may store separately encrypted basic information and detailed information for each of the plurality of users, and provide necessary information to the server 200-1 according to the request of the server 200-1.

Specifically, in the case of user authentication, since the user identification information is received along with the basic information and detailed information separately encrypted from the terminal device 100, the server 200-1 may request and receive encrypted basic information and detailed information corresponding to the identification information to the biometric information DB server 300. Accordingly, the server 200-1 may perform user authentication using the biometric information received from the terminal device 100 and the biometric information received from the biometric information DB server 300.

In the case of user identification, when the basic information and detailed information separately encrypted from the terminal device 100 are received, the server 200-1 may request and receive all encrypted basic information registered in the biometric information DB server 300, and compare the received basic information with the basic information received from the terminal device 100. Accordingly, the server 200-1 may request the biometric information DB server 300 with detailed information corresponding to at least one basic information having a similarity greater than or equal to a predetermined value, and perform user identification by comparing the detailed information received from the terminal device 100 with the detailed information received from the terminal device 100. Here, the encrypted information may be compared with each other after decryption.

Figure 7B:
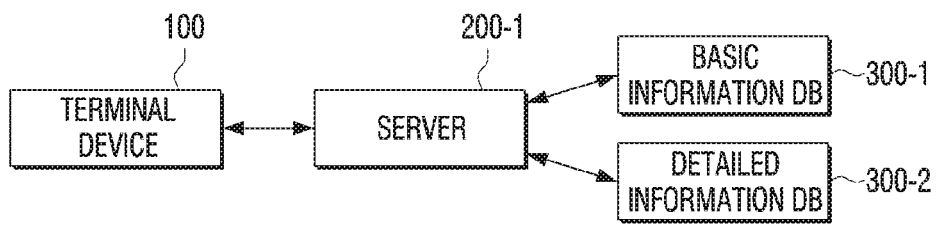

FIG. 7B illustrates an example in which the biometric information DB server 300 is divided into a basic information DB server 300-1 for storing and managing encrypted basic information and a detailed information DB server 300-2 for storing and managing encrypted detailed information, unlike in FIG. 7A. There is only a difference in that the server 200-1 may request the encrypted detailed information to the basic information DB server 300-1, and request the encrypted detailed information to the detailed information DB server 300-2, and the remaining contents are the same as described above with reference to FIG. 7A, and thus a detailed description thereof will be omitted.

Figure 7C:
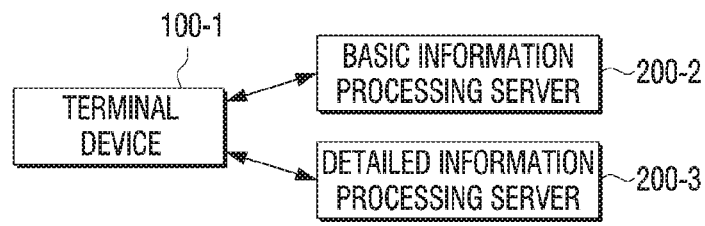

FIG. 7C illustrates that the server 200 is divided into a basic information processing server 200-2 and a detailed information processing server 200-3.

In the case of user identification, according to FIG. 7C, when the encrypted basic information for a specific user is received from the terminal device 100-1, the basic information processing server 200-2 may decrypt the stored encrypted basic information and the received encrypted basic information, compare the decrypted basic information with the received encrypted basic information, and provide the terminal device 100-1 with the identification information for at least one user corresponding to the basic information having the similarity greater than or equal to the predetermined value When the terminal device 100-1 transmits at least one identification information received from the basic information processing server 200-1 and the encrypted detailed information for the specific user to the detailed information processing server 200-3, the detailed information processing server 200-3 may perform user identification for a specific user by decrypting and comparing detailed information for the user corresponding to the identification information received from the terminal device 100-1 among the stored detailed information and detailed information about the specific user received from the terminal device 100-1.

In the case of user authentication, the terminal device 100-1 may transmit the user identification information and the encrypted basic information to the basic information processing server 200-2, and the basic information processing server 200-2 may decrypt and compare the stored basic information corresponding to the received identification information. If the similarity is equal to or greater than a predetermined value, the basic information processing server 200-2 notifies the terminal device 100-1 that the similarity is greater than or equal to a predetermined value, and the terminal device 100-1 may transmit the detailed information encrypted with the user identification information to the detailed information processing server 200-3. The detailed information processing server 200-3 may decrypt and compare the stored encrypted detailed information corresponding to the received identification information with the encrypted detailed information received from the terminal device 100-1, perform final user authentication, and transmit the result to the terminal device 100-2.

The basic information processing server 200-2 may store encrypted basic information for each of a plurality of users and the detailed information processing server 200-3 may store encrypted detailed information for each of a plurality of users.

In FIGS. 7B and 7C, since the basic information and detailed information are separately stored and managed, it is preferable that the basic information and the detailed information are encrypted in a separate data format and stored in each of the servers 300-1, 300-2, 200-2, and 200-3, but the embodiment is not limited thereto.

Figure 7D:
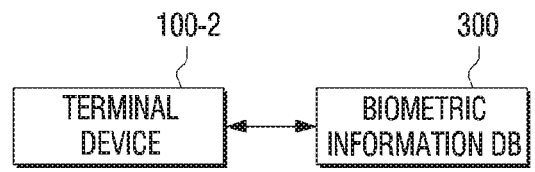

FIG. 7D illustrates an embodiment in which the terminal device 100-2 includes the function of the server 200-1 of FIG. 7A. According to FIG. 7D, since the terminal device 100-2 performs the function of the server 200-1, the biometric information sensed by the terminal device 100-2 needs not be transmitted to the external server. Since the other descriptions are the same as in FIG. 7A, a detailed description thereof will be omitted.

Figure 8:
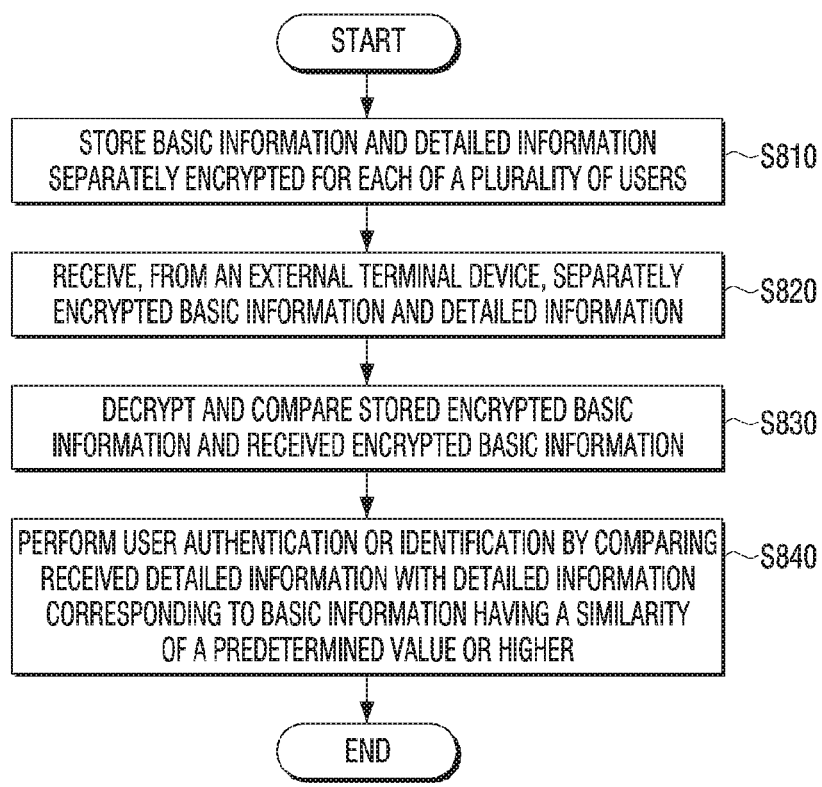
FIG. 8 is a flowchart illustrating a method for controlling a server for performing authentication or identification using biometric information according to an embodiment.

FIG. 8 is a flowchart illustrating a method for controlling a server for performing authentication or identification using biometric information according to an embodiment. In illustrating FIG. 8, the description overlapping with the above will be omitted.

Referring to FIG. 8, the server 200 stores separately encrypted basic information and detailed information for each of a plurality of users in operation S810. Specifically, the server 200 may separately encrypt and store biometric information of users who subscribe to the authentication or identification service provided by the server 200 with basic information and detailed information. Alternatively, the user may receive and store the biometric information separately encrypted with the basic information and detailed information in the terminal of the subscribers. The biometric information may be divided into basic information and detailed information by various criteria, and the amount of information may be less than the detailed information.

For example, the biometric information may include, but is not limited to, at least one of fingerprint information, face information, and iris information of a user. According to an embodiment, if biometric information is fingerprint information, the server 200 may divide basic information and detailed information based on the core point of a fingerprint, and if the biometric information is the face information, basic information and detailed information may be divided based on the facial contour, and if the biometric information is iris information, basic information and detailed information may be divided based on the upper and lower eyelids.

Meanwhile, according to an embodiment, the server 200 may store the biometric information in one data format for each of a plurality of users, and the basic information and the detailed information may be such that the biometric information is hierarchically encrypted in the one data format. According to another embodiment, the server 200 may store basic information and detailed information in a separate data format for each of a plurality of users, and the basic information and the detailed information may be hierarchically encrypted in a separate data format.

Thereafter, if the separately encrypted basic information and detailed information are received from the terminal device 100 to authenticate or identify the user through the biometric information of the user in operation S820, the server 200 may decrypt the stored encrypted basic information and the received encrypted basic information, respectively, and compare the decrypted information in operation S830. The server 200 may perform user authentication or identification related to the received basic information and the detailed information by comparing the received basic information of the stored basic information and the received detailed information with at least one stored detailed information corresponding to the basic information having a similarity greater than or equal to a predetermined value in operation S840.

The server 200 may decrypt all the stored basic information to calculate a similarity with the received basic information, respectively, and decrypt and compare the received detailed information with at least one stored detailed information corresponding to the basic information having a similarity greater than or equal to a predetermined value to perform user identification.

The server 200 may receive identification information and the separately encrypted basic information and detailed information for a specific user from the terminal device 100, decrypt the basic information and the received encrypted basic information for the specific user among the stored encrypted basic information to calculate similarity, and if the calculated basic information similarity is greater than or equal to a predetermined value, the server 200 may perform user authentication for the specific user by decrypting and comparing the stored detailed information corresponding to the specific user and the received detailed information.

It has been described as an example that the biometric information of the user is divided into two layers, such as basic information and detailed information, to be encrypted and stored, but the embodiment is not limited thereto. For example, the biometric information of the user may be divided into three or more layers and separately encrypted and then managed and stored.

As described above, according to various embodiments, provided are a server for performing authentication or identification by using hierarchically encrypted biometric information, a method for controlling a server, and a terminal device. Accordingly, the performance degradation of a user authentication/identification system using biometric information due to unnecessary decrypting may be minimized.

Hereinbelow, an example of using a fingerprint as biometric information will be described.

The method for authenticating a fingerprint of a user is largely classified into an image-based authentication method and a minutiae point-based authentication method. The embodiments of the disclosure may be applied to both methods. For example, in the case of the image-based authentication method, rough contour information of the obtained fingerprint image is used as basic information, and the specific entire image information may be used as detailed information. In the case of a minutiae point-based authentication method, some minutiae point information of a plurality of minutiae points included in the obtained fingerprint may be used as basic information, and the entire minutiae point information may be used as detailed information.

Recently, the minutiae point-based authentication method is more highlighted. Hereinbelow, the embodiment applied to the minutiae point-based authentication method will be described in greater detail.

The fingerprint has widely been used to identify people since 20$^{th}$ century by forensic scientists. Furthermore, these days the fingerprint is the most widely used in several cases including cellphones, laptop, building entrance, and immigration. A variety of ways to authenticate fingerprints have been proposed. Among them, the minutiae points based approaches are provided that they are the most accurate and promising methods by the recent result of fingerprinting matching competition.

The minutiae points have major characteristics of the fingerprint such as ridge ending and bifurcation. On the other hand, the minutiae extraction of the fingerprint is not reliable because of presence of noise arisen from various factors such as resolution of the scanner, noise on fingerprint (dust, water, and so forth), light, and so on. If a fingerprint alignment algorithm that is robust to incorrect and unreliable feature extraction of the fingerprint is devised, the better accuracy of fingerprint authentication may be achieved. Unfortunately, it is very challenging to apply most of them to privacy preserving fingerprint authentication because operations defined over plaintext such as comparison is hard to be used in cipher text. In fact, most works of privacy preserving outsource fingerprint authentication protocols focus on the matching step because of the computational difficulty of finding an efficient alignment method.

According to an embodiment, a new secure fingerprint authentication protocol with pre-alignment for online to offline (O2O) services between two parties, a user with a built-in scanner device (it may be the aforementioned terminal device 100) and a fingerprint authentication service provider (it may be aforementioned server 200) may be provided. An outsourced fingerprint authentication using an inner product encryption (IPE), in which an encrypted fingerprint template is stored in service provider (SP) and a master secret key (msk) is stored in a user side may be adopted.

It may be assumed that a metric for fingerprint matching such as Hamming distance and Euclidean distance could be computed using inner product computation. The operations of the outsourced fingerprint authentication using inner encryption are described as follows: 1) First, a device scans user's fingerprint and computes IPE-decryption keys of minutiae points on the fingerprint. 2) The device registers the encrypted fingerprint as a template to the service provider. 3) When performing authentication, the device scans user's fingerprint as a sample and computes IPE-cipher text of minutiae points on it. 4) The service provider runs decryption algorithm of IPE publicly to obtain metric between template and sample and finally determines the matching result. Unlike, garbled circuit based multi-party computation, it requires only small number of interactions in the registration and authentication phases.

According to an embodiment, to reduce the number of iterations and improve the efficiency of the protocol, privacy preserving alignment and matching protocol for fingerprint may be provided to achieve better performance. One more interaction is added between the user and the service provider for a secure fingerprint alignment. When registering a finger print, reference points are additionally used for alignment as well as minutiae points. As the number of reference points are relatively small compared to minutiae points and the performance could be dramatically improved. As a result of the performance evaluation, the time for a single user authentication takes less than one second. This result is at least 60 times faster than two-way setting which exploits Garbled circuit for outsourced minutiae-based fingerprint authentication.

According to an embodiment, the reference point information may be included in the aforementioned basic information, and the minutiae point information may be included in the aforementioned detailed information. Therefore, the reference point information and the minutiae point information may be separately encrypted and decrypted for storing, transmitting, and processing.

Figure 9A:
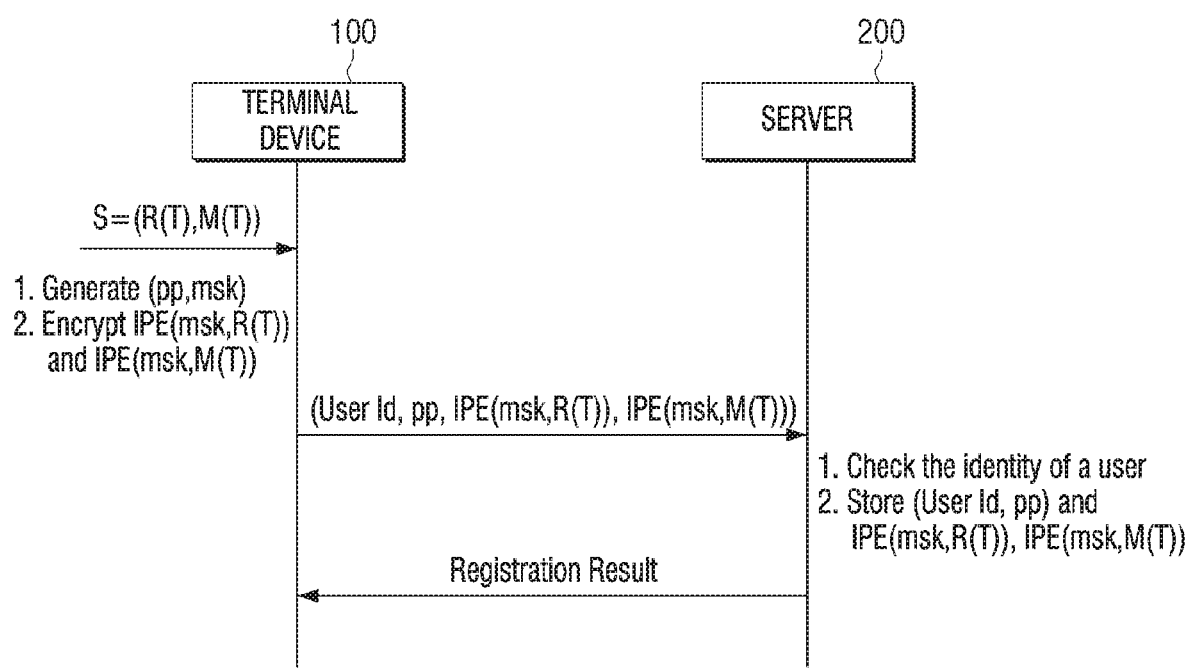
FIGS. 9A and 9B are exemplary diagrams of a fingerprint authentication method according to an embodiment.
Figure 9B:
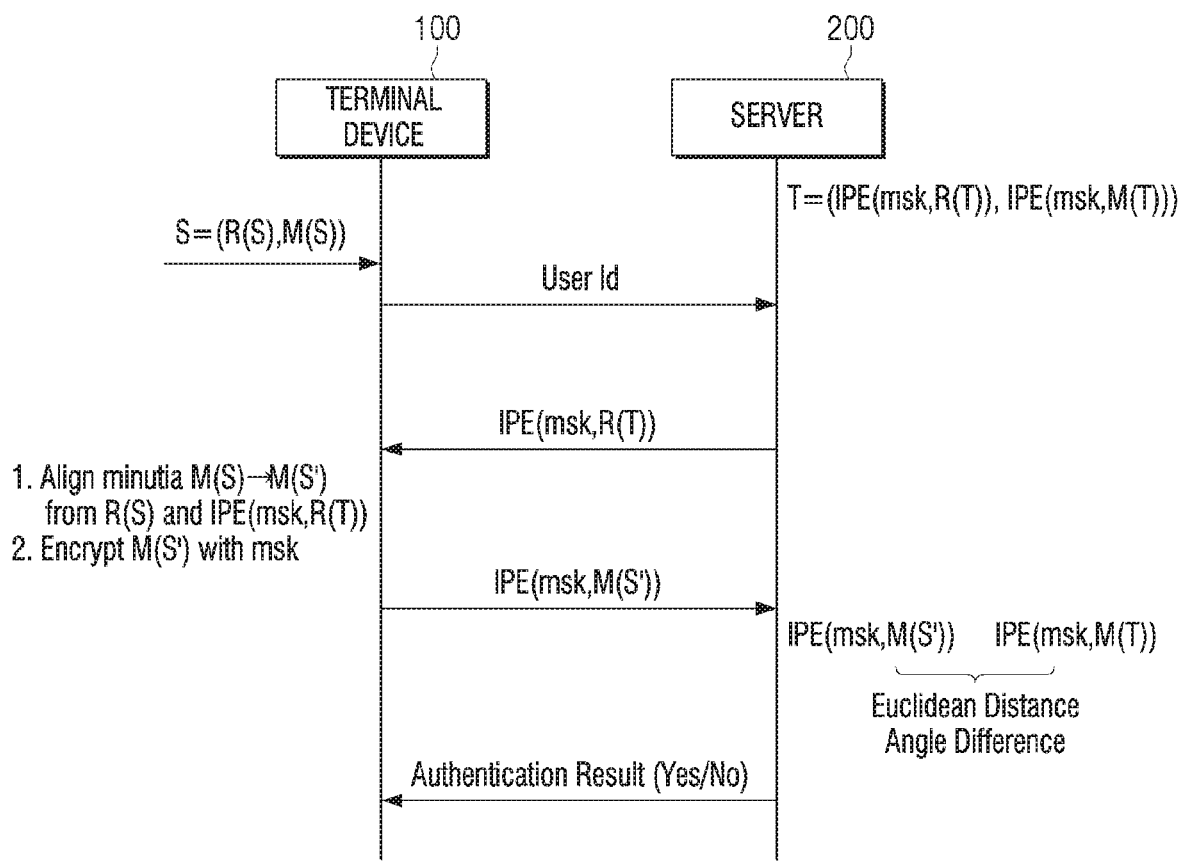
Figure 10:
FIG. 10 is an exemplary diagram illustrating a reference point of a fingerprint according to an embodiment.

With reference to FIGS. 9 and 10, the operations of the terminal device 100 and the server 200 according to an embodiment will be described. FIGS. 9A and 9B are exemplary diagrams of a fingerprint authentication method according to an embodiment and FIG. 10 is an exemplary diagram illustrating a reference point of a fingerprint according to an embodiment.

Specifically, FIG. 9A illustrates the operation of the terminal device 100 and the server 200 in the fingerprint registration step. As shown in FIG. 9A, the terminal device 100 may scan a user's fingerprint (T) used as a template, and generate a master key (msk) and a public parameter (pp). However, the order is not limited to this, and the terminal device 100 may first generate the master key and the common parameter and then scan the user's fingerprint (T).

The template (T) may be composed of a set of minutiae points (M(T)) and a set of reference points (R(T)). The reference point (R(T)) is essential for the alignment of the fingerprint, which may include core points and delta points or may include high curvature points, depending on the applied alignment methods. The left figure of FIG. 10 shows an example of a core point (indicated by a rectangle) and a delta point (indicated by a triangle), and the right figure of FIG. 10 shows a high curvature point (indicated by circles). The configuration of the reference point is not necessarily limited to the example of FIG. 10, and any combination of points included in the fingerprint may constitute a reference point if fingerprint alignment is possible.

The minutiae point (M(T)) are points used for detailed matching of fingerprint and may include, for example, but is not limited to, fingerprint, one or more core points, a delta point, a bifurcation, an island point, a bridge point, a crossover point, a spur point, a ridge ending, and the like, included in the fingerprint.

Accordingly, the terminal device 100 may perform inner product encryption (IPE) for the reference point (R(T)) and transmit the same, to the server 200, along with a user ID and a public parameter (pp), respectively, using the generated master key. Here, the user ID may be input to the terminal device 100 by a user who desires to register a fingerprint, but is not limited thereto.

The server 200 may identify a user identity ID, match and store the user ID, a public parameter (pp), and a reference point of an internally encrypted template (IPE (msk, R(T)) and a minutiae point (IPE (msk, M(T)) of an internally encrypted template, respectively, and then transmit the registration result to the terminal device 100.

FIG. 9B illustrates the operation of the terminal device 100 and the server 200 in the fingerprint authentication step. As shown in FIG. 9B, the terminal device 100 may scan a finger print to be authenticated (hereinafter, a sample (S)) to obtain the reference point (R(S)) and the minutiae point (M(S)) of the sample. Thereafter, the terminal device 100 may transmit the ID of the user input by the user who has scanned the sample to the server 200. Accordingly, the server 200 may transmit, to the terminal device 100, the reference point (IPE (msk, R(T)) information of the internally encrypted template corresponding to the received user ID among the stored information.

The terminal device 100 may align the minutiae point (M(S)) of the sample based on the reference point (IPE (msk, R(T)) of the internally encrypted template received from the server 200 and the reference point (R(S)) of the sample.

For example, the terminal device 100 may internally encrypt a reference point of a sample to calculate IPE (msk, R(S)), and operate the calculated IPE (msk, R(S)) with the IPE (msk, R(T)) received from the server 200 to calculate an alignment parameter (A) including information about the coordinates and angle differences between the template's reference point (R(T)) and the sample's reference point (R(S)). Accordingly, the terminal device 100 may calculate a minutiae points M (S') of the aligned samples by aligning the minutiae points (M(S)) of the sample based on the alignment parameter $\Delta$. In this case, the reference point (R(T)) of the internally encrypted template is not decrypted.

Alternatively, the terminal device 100 may decrypt the IPE (msk, R(T)) received from the server 200, calculate a decrypted template reference point (R(T)), by comparing the (R(T)) with the reference point of the sample to calculate the information (alignment parameter ($\Delta$)) regarding the coordinate and angle differences between the (R(T)) and the (R(S)), and calculate the minutiae point (M(S')) of the aligned sample through aligning the minutiae point (M(S)) based on the calculated information.

When calculating the difference of coordinates and angles in the above example, a greedy method may be used in some embodiments.

The terminal device 100 may internally encrypt minutiae point (M(S')) of the aligned samples, generate the minutiae point (IPT (msk, M(S')) of the internally encrypted aligned sample, and transmit the same to the server 200, and the server 200 may compare the minutiae point (IPE (msk, M(S')) of the internally encrypted aligned sample and the minutiae point (IPT (msk, M(T))) of the internally encrypted template to calculate the inner product for the Euclidian distance and angular difference, and count the number of minutiae points which match with each other.

Accordingly, the server 200 may determine that the identity of the user has been authenticated when the number of the counted matching points is greater than or equal to a predetermined number, and determine that the identity of the user is not authenticated when the number of the counted matching points is less than a predetermined number, and transmit the authentication result to the terminal device 100. As in the same manner as calculating the coordinates and angular differences, a greedy method may be used even when determining the matching points of the template and the sample.

Figure 11:
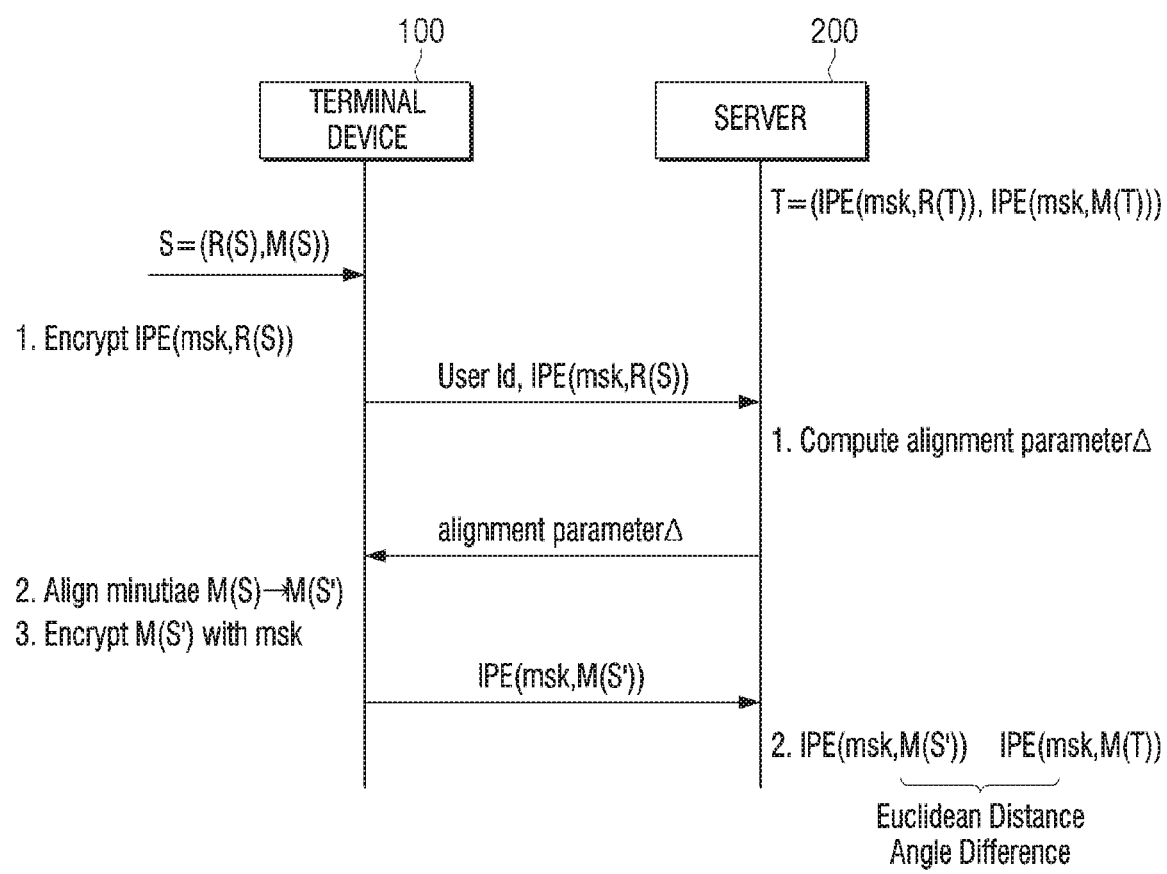
FIG. 11 is an exemplary diagram of a fingerprint authentication method according to another embodiment.

FIG. 11 is an exemplary diagram of a fingerprint authentication method according to another embodiment. FIG. 11 illustrates, with an assumption that the finger registration step as FIG. 9A has been conducted, an operation of the terminal device 100 and the server 200 in the authentication step of authenticating a fingerprint in a way different from FIG. 9B. In illustrating FIG. 11, the descriptions overlapping with FIG. 9 and FIG. 10 will not be described.

Referring to FIG. 11, the terminal device 100 may scan a fingerprint (hereinafter, a sample (S)) to be authenticated and obtain the reference point (R(S)) and the minutiae point (M(S) of the sample. The terminal device 100 may internally encrypt the reference point (R(S)) of the sample and transmit the sample to the server 200 along with the user ID.

Accordingly, the server 200 may calculate an alignment parameter ($\Delta$) by calculating the internally encrypted reference point (IPE (msk, R(T)) of the sample corresponding to the user ID and the reference point (IPE (msk, R(S)) of the internally encrypted sample received from the terminal device 100, and transmit the calculated alignment parameter ($\Delta$) to the terminal device 100.

The terminal device 100 may align the minutiae point (M(S)) of the sample using the received alignment parameter ($\Delta$), internally encrypt the aligned sample's minutiae point (M(S')) using the master key (msk), and then transmit the minutiae point (IPE (msk, M(S')) of the internally encrypted aligned sample to the server 200.

Accordingly, the server 200 may compute the matching result from the minutiae point (IPE (msk, M(S')) of the internally encrypted aligned sample and the minutiae point (IPE (msk, M(T)) of the internally encrypted template.

The example of FIG. 11 operates differently from FIG. 9B in terms of calculating the alignment parameter by the server 200 and transmitting the parameter to the terminal device 100.

As described above, according to various embodiments, it is possible to improve the processing speed of the system by separately encrypting and decrypting the reference point information for the alignment of the fingerprint as basic information and the minutiae point information for detailed matching of a fingerprint as detailed information, and by using an inner product encryption (IPE), fingerprint authentication may be performed without decrypting the encrypted fingerprint information, and security may be enhanced.

In the examples of FIGS. 9 to 11, the operations of the terminal device 100 and the server 200 may be performed by the processor 120 of the terminal device 100 and the processor 220 of the server 200, respectively.

Here, various embodiments of the disclosure may be implemented in software, including instructions stored on machine-readable storage media readable by a machine (e.g., a computer). An electronic apparatus, including servers 200, 200-1, 200-2, 200-3 or terminal devices 100, 100', 100-1, 100-2, may call instructions from the storage medium and execute the called instruction according to the embodiments of the disclosure. When the instructions are executed by a processor, the processor may perform a function corresponding to the instructions directly or by using other components under the control of the processor. The instructions may include a code generated by a compiler or a code executable by an interpreter. A machine-readable storage medium may be provided in the form of a non-transitory storage medium. Herein, the term "non-transitory" only denotes that a storage medium does not include a signal but is tangible, and does not distinguish the case in which data is semi-permanently stored in a storage medium from the case in which data is temporarily stored in a storage medium According to an embodiment, the method according to the above-described embodiments may be provided as being included in a computer program product. The computer program product may be traded as a product between a seller and a consumer. The computer program product may be distributed online in the form of machine-readable storage media (e.g., compact disc read only memory (CD-ROM)) or through an application store (e.g., Play Store™ and App Store™) or distributed online (e.g., downloaded or uploaded) directly between to users (e.g., smartphones). In the case of online distribution, at least a portion of the computer program product may be at least temporarily stored or temporarily generated in a server of the manufacturer, a server of the application store, or a machine-readable storage medium such as memory of a relay server.

According to embodiments of the disclosure, the respective elements (e.g., module or program) of the elements mentioned above may include a single entity or a plurality of entities. Furthermore, at least one element or operation from among the corresponding elements mentioned above may be omitted, or at least one other element or operation may be added. Alternatively or additionally, a plurality of components (e.g., module or program) may be combined to form a single entity. As such, the integrated entity may perform functions of at least one function of an element of each of the plurality of elements in the same manner as or in a similar manner to that performed by the corresponding element from among the plurality of elements before integration. The module, a program module, or operations executed by other elements according to variety of embodiments may be executed consecutively, in parallel, repeatedly, or heuristically, or at least some operations may be executed according to a different order, may be omitted, or the other operation may be added thereto.

Although the disclosure has been described by way of examples, it will be understood by those skilled in the art that various changes in form and details may be made therein without departing from the essential characteristics thereof. In addition, the embodiments according to the disclosure are not intended to limit the technical spirit of the disclosure, but to describe the technical aspect and the scope of the technical aspect of the disclosure is not limited by the embodiments herein. Accordingly, the scope of protection of the disclosure should be construed by the following claims, and all technical ideas that fall within the scope of the disclosure are to be construed as falling within the scope of the disclosure.

What is claimed is:

1. A server for performing authentication or identification using biometric information including basic information and detailed information, the server comprising:
   a storage for storing basic information and detailed information that are separately encrypted for each of a plurality of users;
   a communicator for communicating with an external device; and
   a processor configured to:
   based on separately encrypted basic information and detailed information being received from an external terminal device through the communicator, performing user authentication or user identification for the received basic information and detailed information by decrypting and comparing the stored encrypted basic information and the received encrypted basic information, and comparing the received detailed information with at least one piece of stored detailed information corresponding to a piece of basic information having a degree of similarity that is higher than or equal to a predetermined value with the received basic information among the stored basic information;
   wherein: based on the biometric information being fingerprint information, the basic information comprises reference point information that is used for finger alignment, and the detailed information comprises minutiae point information that is used for detailed matching of the fingerprint; and
   the reference point comprises a core point or a delta point of the fingerprint, or one or more high curvature points of the fingerprint.

2. The server of claim 1, wherein the basic information is configured to have less information amount than the detailed information.

3. The server of claim 1, wherein the processor is further configured to perform the user identification by decrypting all the stored basic information to calculate a similarity between the decrypted basic information with the received basic information, and decrypting and comparing the at least one stored detailed information and the received detailed information.

4. The server of claim 1, wherein the processor is further configured to:
   based on receiving, from the external terminal device, identification information and the separately encrypted basic information and detailed information, decrypt basic information for the specific user among the stored encrypted basic information and the received encrypted basic information to calculate a similarity, and
   based on the similarity being greater than or equal to a predetermined value, decrypt and compare stored detailed information corresponding to the specific user and the received detailed information to perform a user authentication for the specific user.

5. The server of claim 1, wherein:
   the storage is configured to store the biometric information with one data format for each of the plurality of users, and the basic information and detailed information are information in which the biometric information is hierarchically encrypted in the one data format.

6. The server of claim 1, wherein:
the storage is configured to store the basic information and the detailed information in a separate data format for each of the plurality of users,
the basic information and the detailed information are information in which the biometric information is hierarchically encrypted in the separate data format.

7. The server of claim 1, wherein:
based on the biometric information being fingerprint information, the basic information and the detailed information are classified with respect to a fingerprint core point,
based on the biometric information being face information, the basic information and the detailed information are classified with respect to a face contour, and
based on the biometric information being iris information, the basic information and the detailed information are classified with respect to upper and lower eyelids.

8. A terminal device comprising:
a biometric information detector configured to detect biometric information of a user;
a communicator configured to communicate with an external server; and
a processor configured to:
based on biometric information of the user being detected through the biometric information detector, separate the detected biometric information into basic information and detailed information and encrypt the information respectively, control the communicator to transmit the encrypted basic information and the detailed information to the external server, and authenticate or identify the user according to a processing result of the encrypted basic information and detailed information received from the external server;
wherein: based on the biometric information being fingerprint information, the basic information comprises reference point information that is used for finger alignment, and the detailed information comprises minutiae point information that is used for detailed matching of the fingerprint; and
the reference point comprises a core point or a delta point of the fingerprint, or one or more high curvature points of the fingerprint.

9. The terminal device of claim 8, wherein the basic information has an information amount less than the detailed information.

10. A method for controlling a server performing authentication or identification using biometric information including basic information and detailed information, the method comprising:

storing separately encrypted basic information and detailed information, for each of a plurality of users;
receiving separately encrypted basic information and detailed information from an external terminal device;
decrypting and comparing the stored encrypted basic information and the received encrypted basic information;
performing user authentication or user identification for the received basic information and the detailed information by comparing the received detailed information with at least one piece of stored detailed information corresponding to a piece of basic information having a degree of similarity that is higher than or equal to a predetermined value with the received basic information among the stored basic information;
wherein: based on the biometric information being fingerprint information, the basic information comprises reference point information that is used for finger alignment, and the detailed information comprises minutiae point information that is used for detailed matching of the fingerprint; and
the reference point comprises a core point or a delta point of the fingerprint, or one or more high curvature points of the fingerprint.

11. The method of claim 10, wherein the basic information is configured to have less information amount than the detailed information.

12. The method of claim 10, wherein the decrypting and comparing comprises decrypting all the stored basic information to calculate a similarity between the decrypted basic information with the received basic information, respectively,
wherein the performing user authentication or identification comprises decrypting the at least one stored detailed information and the received detailed information to perform the user identification.

13. The method of claim 10, wherein the receiving comprises receiving, from the external terminal device, identification information and the separately encrypted basic information and detailed information for a specific user,
wherein the encrypting and comparing comprises decrypting basic information for the specific user among the stored encrypted basic information and the received encrypted basic information to calculate a similarity,
wherein the performing the user authentication or identification comprises, based on the similarity being greater than or equal to a predetermined value, decrypting and comparing stored detailed information corresponding to the specific user and the received detailed information to perform a user authentication for the specific user.

* * * * *